United States Patent [19]

Jordan et al.

[11] Patent Number: 4,958,070
[45] Date of Patent: Sep. 18, 1990

[54] DIGITAL ELECTRONICS FOR CONTROLLING A FIBER OPTIC SHEDDING FLOWMETER

[75] Inventors: David W. Jordan, Euclid; William L. Thompson, Montville, both of Ohio

[73] Assignee: The Babcock & Wilcox Company, New Orleans, La.

[21] Appl. No.: 267,896

[22] Filed: Nov. 7, 1988

[51] Int. Cl.$^5$ ............................................. H01J 40/14
[52] U.S. Cl. ............................ 250/227.21; 73/861.24; 250/231.10
[58] Field of Search ............ 250/227, 231 R, 227.18, 250/231.10, 227.21; 73/861.22, 861.23, 861.24

[56] References Cited

U.S. PATENT DOCUMENTS

| | | | |
|---|---|---|---|
| 4,019,384 | 4/1977 | Herzl | 73/861.24 |
| 4,390,956 | 6/1983 | Cornforth et al. | 364/510 |
| 4,589,279 | 5/1986 | Mitsuyasu et al. | 73/118 |
| 4,594,504 | 6/1986 | Coursolle | 250/227 |
| 4,648,280 | 3/1987 | Miyoshi et al. | 73/861.24 |
| 4,706,502 | 11/1987 | Jones | 73/861.24 |
| 4,742,574 | 5/1988 | Smith | 250/227 |

FOREIGN PATENT DOCUMENTS 2135446 8/1984 United Kingdom .

Primary Examiner—David C. Nelms
Assistant Examiner—Sherrie Hsia
Attorney, Agent, or Firm—Vytas R. Matas; Robert J. Edwards; Daniel S. Kalka

[57] ABSTRACT

A digital controlling system for fiber optic vortex shedding flowmeters which provides a new and improved preamp circuit and a computer for correcting temperature, linearity and hysteresis effects. The controlling system overcomes the inherent non-linearity of the vortex shedding phenomena and also provides two-way communication between a central control unit and the fiber optic vortex shedding flowmeter. The improved preamp circuitry increases the low-end range of fiber optic vortex shedding flowmeters.

5 Claims, 4 Drawing Sheets

DIGITAL ELECTRONICS FOR CONTROLLING A FIBER OPTIC SHEDDING FLOWMETER

TECHNICAL FIELD

The present invention relates to a new and useful digital system for controlling a fiber optic vortex shedding flowmeter.

BACKGROUND ART

A fiber optic sensor unit can be used in a vortex shedding flowmeter. In such a flowmeter, a sensor beam is exposed to a flow of fluid that has fluid vortices generated therein by an obstruction in the flow path. The frequency of the fluid vortex generation (called shedding) is a measure of the flow rate for the fluid. Each time a vortex is shed, the sensor beam is moved. This movement is transferred to one of the many known assemblies used for changing the characteristics of light transmitted and received through a fiber optic cable. Such assemblies include microbend jaws which bend the optical fiber or cable modulating the light intensity therein and divided optical fiber assemblies having one of the fiber ends moving in response to the sensor beam, eliminating a portion of the light travelling through the fiber.

It is well known in the art to provide a control system in order to control a vortex shedding flowmeter. A conversion unit must be provided as part of the control system to convert the light signals transmitted through the fiber optic cables into an electrical signal that is compatible with the control system. A communication path must also be provided as part of the control system to transmit the converted electrical signals to a central control unit.

One known and industrially accepted system for conveying signals from a transducer, such as a flowmeter, to a central control unit is a two wire, 4–20 ma analog transmission system. It is known in the art to use a two wire, 4–20 ma transmission system for fiber optic vortex shedding flowmeters, as disclosed in U.S. Pat. No. 4,655,353 (Thompson).

In the analog transmission system the modulated light intensity in the optical cable is converted to an analog current or voltage proportional to the flow indicated by the sensor beam. These analog transmission systems are limited in vortex shedding flowmeter applications. The vortices shed are a non-linear quantity and non-linear signals limit the range of accurate flow signals that can be transmitted on a 4–20 ma path. There are also hysteresis and thermal drift effects in the analog circuitry that limit the repeatability, and therefore the accuracy, of the vortex shedding flowmeter signal that is transmitted through a 4–20 ma path. An analog transmission path cannot provide control signal communication between the flowmeter and a control unit; it can only provide one way communication by transmitting the flow as sensed by the flowmeter to the central control unit. No control signals can be sent from the central control unit to the flowmeter.

The conversion units used in fiber optic vortex shedding flowmeter control systems have also limited the range of vortex shedding flowmeters. Preamp circuits used in present conversion units, such as disclosed in U.S. Pat. No. 4,628,197 (Thompson), are not able to sense low-end signals generated by a vortex shedding flowmeter. Thus, a digital control system for a fiber optic vortex shedding flowmeter is needed which makes adjustments for the non-linearity of the vortex shedding phenomena and corrects or eliminates thermal effects and hysteresis. It has become desirable to provide two-way digital communication between the fiber optic vortex shedding flowmeter and a control unit while also improving the low end sensitivity of the conversion circuitry used in fiber optic vortex shedding flowmeters.

SUMMARY OF THE INVENTION

The present invention overcomes all of the prior art problems associated with the control systems for fiber optic vortex shedding flowmeters. The invention accomplishes this by providing a new and improved preamp circuit and a digital computer for correcting temperature, linearity and hysteresis effects.

Thus, one aspect of the invention is to provide a digital control system for fiber optic vortex shedding flowmeters that is not affected by the non-linearity of the vortex shedding phenomena.

Another aspect of the present invention is to provide a digital control system for fiber optic vortex shedding flowmeters that corrects hysteresis and thermal drift effects.

Yet another aspect of the present invention is to provide a digital control system for fiber optic vortex shedding flowmeters that transmits and receives control signals from the vortex shedding flowmeter.

Yet another aspect of the present invention is to provide a digital control system for fiber optic vortex shedding flowmeters that increases the low end range of vortex shedding flowmeters.

DESCRIPTION OF THE PREFERRED EMBODIMENT

Figure 1:
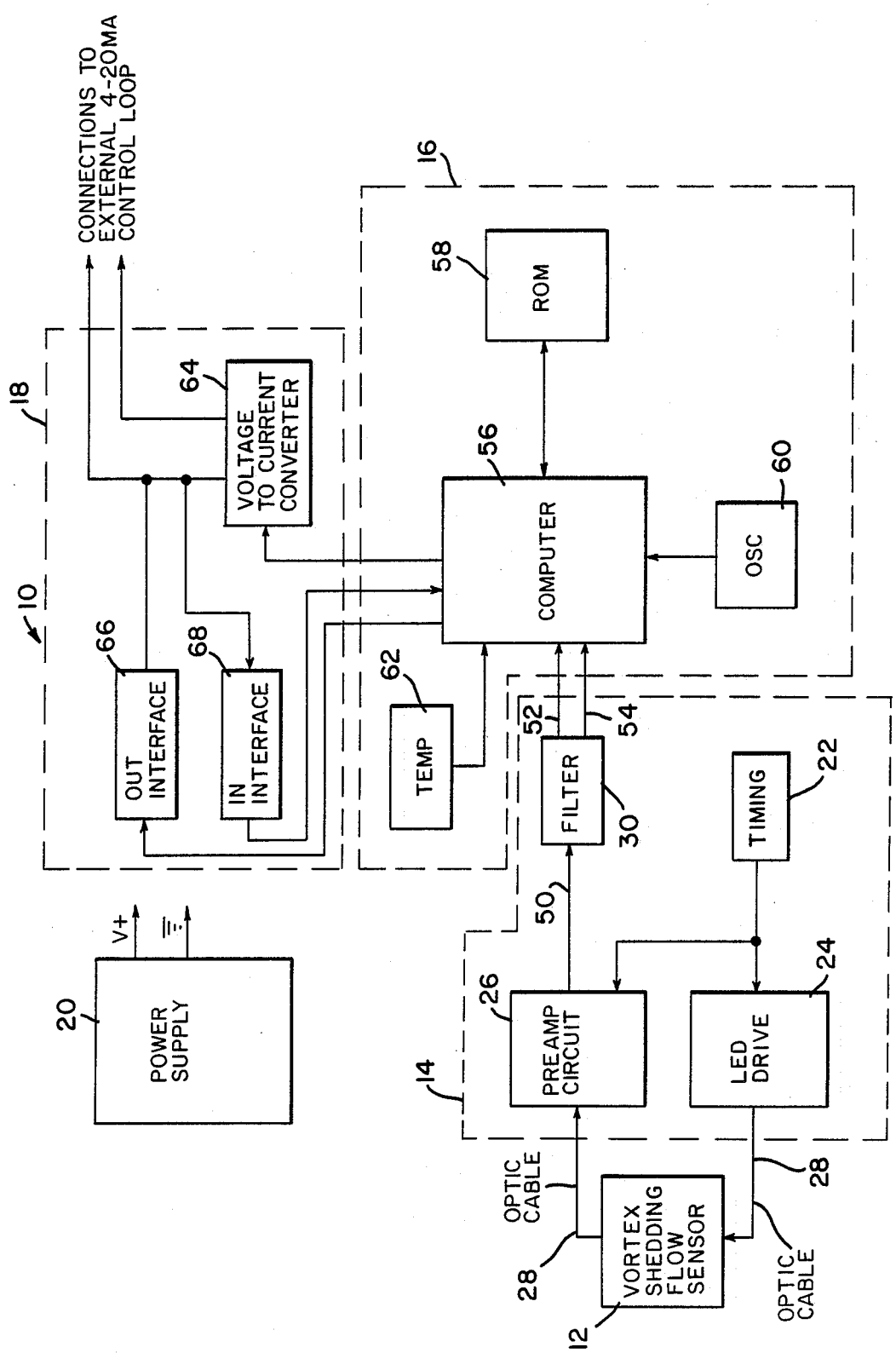
FIG. 1 is a block diagram of the inventive control system.

Referring now to the drawings where the illustrations are for the purpose of generally describing the preferred embodiment of the present invention and are not intended to limit the invention hereto, with particular reference to FIG. 1, a digital control system 10 for a fiber optic vortex shedding flowmeter is provided including a fiber optic vortex shedding flow sensor 12, a conversion unit 14, a central control unit 16, a digital communications unit 18, and a power supply 20.

The conversion unit 14 includes a timing circuit 22 connected to an LED drive circuit 24 and a preamp circuit 26. The LED drive circuit 24 is connected by a fiber optic cable 28 through the vortex shedding flow sensor 12 to the preamp circuit 26. Preamp circuit 26 is connected to a filter circuit 30 which is connected over lines 52 and 54 to the central control unit 16.

Figure 2:
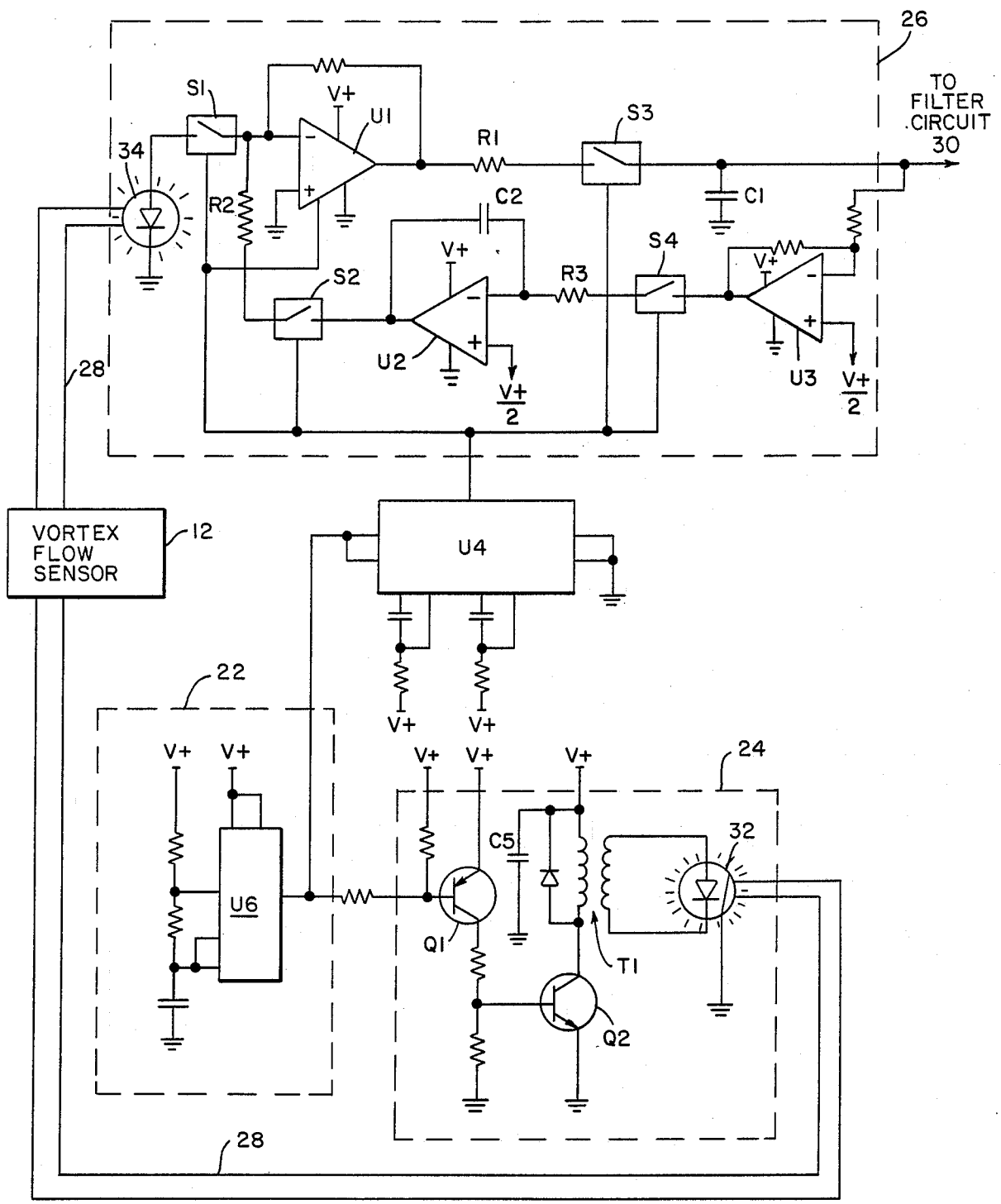
FIG. 2 is a schematic diagram showing a circuit for optical to electrical conversion.

Referring now to FIG. 2, a schematic diagram of timing circuit 22, LED drive circuit 24, and preamp 26 is illustrated. In operation, current to an LED 32 (light emitting diode.) is supplied as a series of pulses, typically having a duty cycle of 1 percent, an amplitude of 100 to 200 ma and a repetition rate or frequency of about 800 hz. Oscillator U6, typically a low power CMOS version of a 555 timer, such as a 7555 timer, is used to generate the control signal for the current passing through LED 32. Transistors Q1 and Q2 amplify the output of the 7555 timer. Transformer T1 serves to match the drive requirements of 1.5 volts for LED 32 to the circuit's higher drive voltage of typically 6 to 10 volts. This transformer T1 is typically a pulse transformer with a 4:1 turns ratio. Capacitor C5 serves to isolate the high pulses of current from creating voltage pulses on the power supply 20 for the rest of the drive circuit 24 by storing charge in the capacitor C5 between LED 32 pulses. The current passing through LED 32 primarily results from the charge stored in capacitor C5.

The light pulses are transmitted through fiber optic cable 28 and through the vortex shedding flow sensor 12 to a light detector 34 of the preamp circuit 26. Varying attenuation is affected by bending the fiber optic cable 28 or by changing the degree of light at a coupling within the fiber optic cable 28 so that the resulting variation in the amount of light is proportional to the fluid flow in the flowmeter 12. The light detector 34 converts the received light into an electrical signal, typically a current, and supplies it to the remainder of the preamp circuit 26 through a switch S1.

When oscillator U6 generates the control signal for LED 32 it also sends the same control signal to a one-shot multivibrator U4. Multivibrator U4 is triggered by the leading edge of the pulse being transmitted, energizing switches S1, S2, S3 and S4 and operational amplifier U1. Thus, circuit 26 is "turned on" when LED 32 is pulsed.

Operational amplifier U1 converts the current pulses it receives into voltage pulses. Operational amplifier U1 is energized to its high speed, high power mode of operation when multivibrator U4 is energizing switches S1 through S4. This operational amplifier then returns to its low speed, low power mode until the next pulse to LED 32 is received. Thus, this operational amplifier is not drawing high power during periods when it is not necessary for the operation of the circuit. During the off period, operational amplifier U1 has its input connections switched into a voltage follower mode which tends to hold its output voltage fairly constant until the next pulse. Thus, there is not a great change in voltage at the output stage when the next pulse is amplified.

A peak-following sample and hold function is performed by the combination of capacitor C1, resistor R1 and switch S3 for remembering the output of operational amplifier U1 until the next pulse to LED 32. The time constant of this combination is determined by the values of resistor R1 and capacitor C1 and the pulse duty cycle. The time constant must be fast enough to permit the largest sensor signal to pass.

Figure 3:
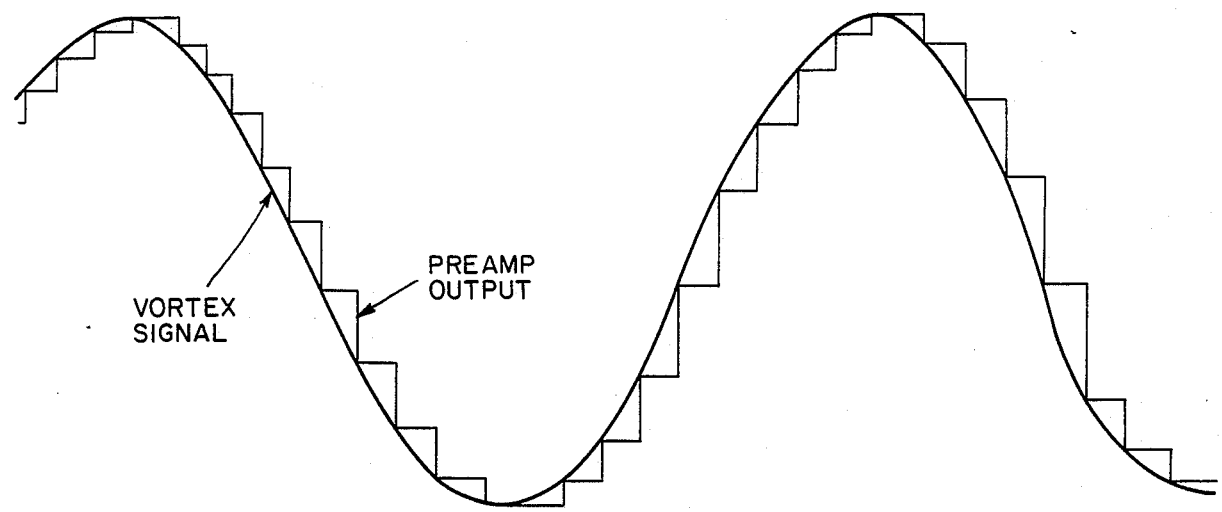
FIG. 3 is a graph showing the output of a preamp circuit.

Operational amplifiers U2 and U3 provide a feedback loop for drawing a current through resistor R2 that is equal to the average peak current of the pulses. This current is applied to the inverting input to operational amplifier U1. In this manner, the average peak values of the signal from the light detector 34 are removed from the output of operational amplifier U1. Because of this, the only amplified signals that are seen at the output of operational amplifier U1 is the modulation from the average peak values of signals from the light detector 34 and these signals are the only signals that are needed to determine the flow through flow sensor 12. Thus, all low end noise is blocked out. The time constant of this loop is long enough so that the lowest frequency desired is allowed to pass but lower frequencies or noise are cancelled by the feedback loop. Resistor R3, capacitor C2, and the pulse duty cycle determine this time constant. FIG. 3 shows a typical output signal sent to filter circuit 30.

Figure 4:
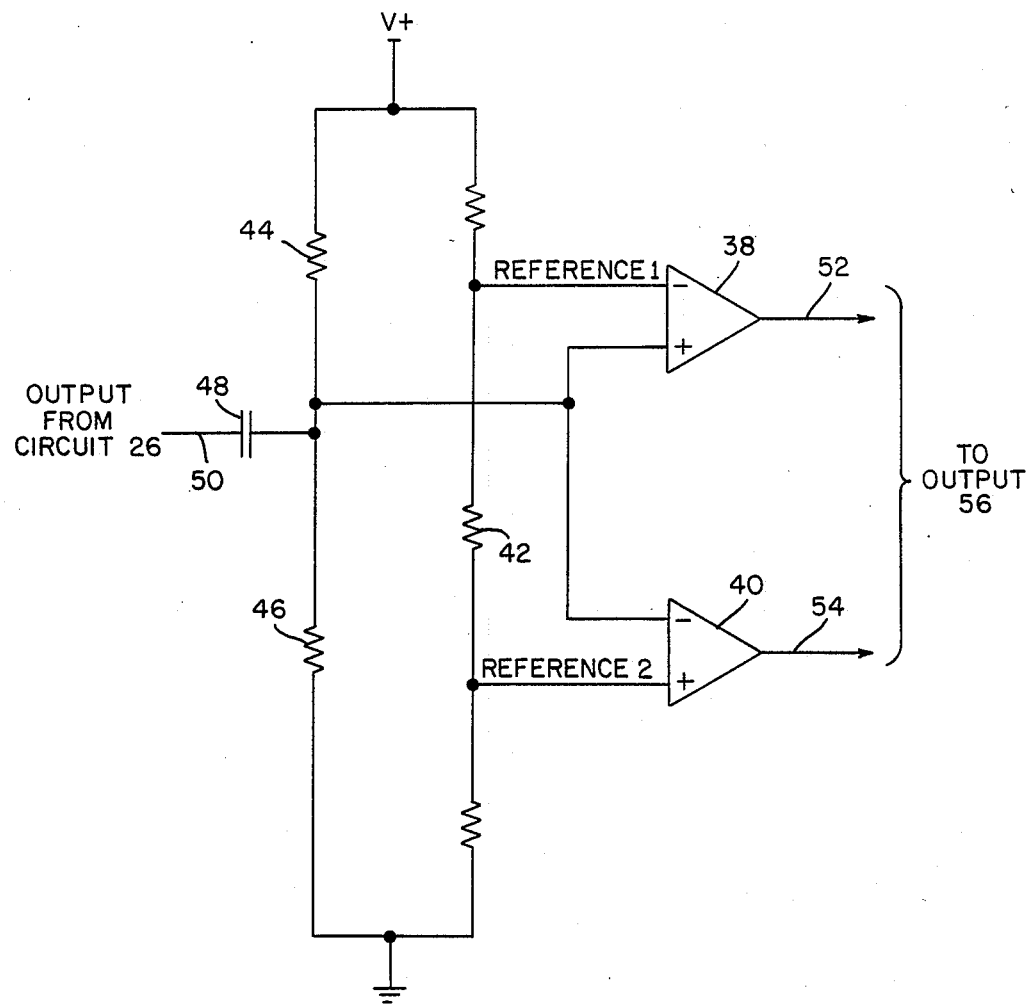
FIG. 4 is a schematic diagram showing a filter circuit.

Referring now to FIG. 4, a schematic diagram of filter circuit 30 comprising comparators 38 and 40 is illustrated. These comparators 38 and 40 are typically operational amplifiers and are of opposite polarities and have reference voltages applied thereto. These voltages are of different magnitude as determined by a small voltage across a resistor 42. The reference voltages are equidistant from signal common (typically, one-half of V+). Resistors 44 and 46 and capacitor 48 form a high pass filter that allows all expected signals on line 50 from preamp circuit 26 to pass therethrough.

Figure 5:
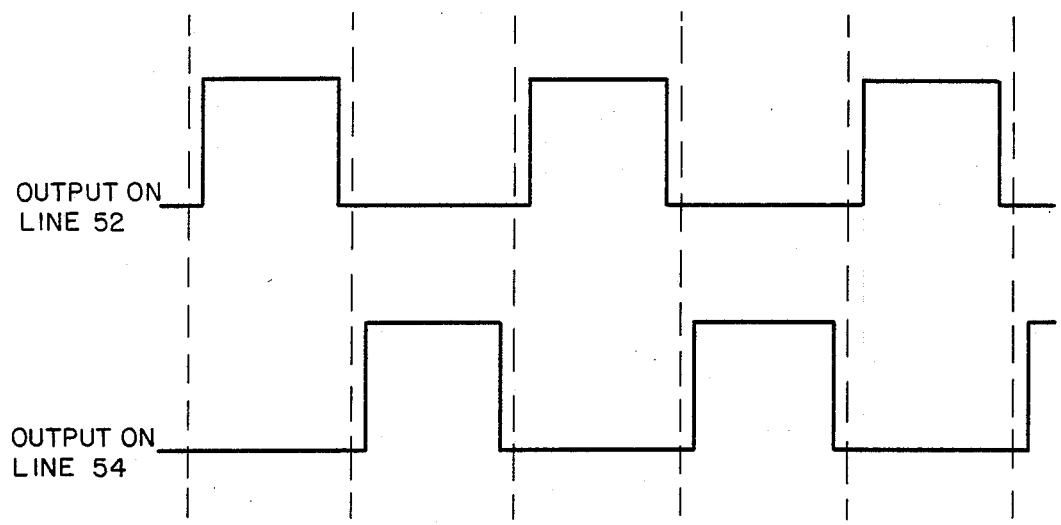
FIG. 5 is a graph showing the output of a filter circuit.

In operation, when a sine wave is applied to the two comparators 38 and 40, the respective outputs thereof are two rectangular wave voltages having a slightly less than 50% duty cycle and being 180 degrees out of phase, as shown in FIG. 5. The output from operational amplifier 38 on line 52 is in the high state when its input from preamp circuit 26 on line 50 is above reference level 1, and the output from operational amplifier 40 on line 54 is in the high state when its input from preamp circuit 26 on line 50 is below reference level 2. This filter circuit 30 eliminates noise by generating a square wave that is unaffected by variations in the signal over or under the foregoing reference levels.

Referring again to FIG. 1, the rectangular waves on lines 52 and 54 are inputted to a computer 56 which is typically a microprocessor. Computer 56 has the ability to perform certain functions on the rising edge of a square wave, such as those which are transmitted on lines 52 and 54. These functions are provided by software programs stored in an 8K byte read-only-memory (ROM) 58. One software program calculates the flow of the fluid in the flowmeter by determining the difference between the two output signals on line 52 and 54 and a preset timing oscillator 60. Other programs stored in ROM 58 perform calculations on input signals 52 and 54 to correct for nonlinearity of the vortex shedding phenomena. Calculations can also be made to correct for temperature drift effects as determined by an ambient temperature sensor 62. The reason that timing offset in the signals on lines 52 and 54 is needed is to provide two different leading edges to commence the various software actions at different times, as required. Finally, after all corrections and calculations have been completed, computer 56 sends an output pulse width to a voltage to current converter 64. Converter 64 regulates the 4–20 ma current loop according to the calculated values from computer 56. The operation of converter 64 is more fully described in U.S. Pat. No. 4,604,566.

OUT and IN interfaces 66 and 68, respectively, allow digital communication between the computer 56 and a central control station (not shown). These interfaces 66 and 68 allow an operator to interrogate the flowmeter for variables such as flow rate, calibration, ambient temperature, and the mechanical performance of the flowmeter. The operator can then make adjustments which are necessary. OUT interface 66 is more fully described in U.S. Pat. No. 4,607,247 and IN interface is more fully described in U.S. Pat. No. 4,729,125.

Certain modifications and improvements will occur to those skilled in the art upon reading the foregoing. It should be understood that all such modifications and improvements have been deleted herein for the sake of conciseness and readability, but are properly within the scope of the following claims.

What is claimed is:

1. A digital electronics system for controlling a fiber optic vortex shedding flowmeter, comprising:
   light emitting means;
   light detecting means;
   light connecting means connected to said light emitting means and said light detecting means for varying the attenuation of light from said light emitting means to said light detecting means according to a variable to be measured;
   means for generating an electrical signal proportional to said varied attenuation of light, said generating means having a feedback circuit which eliminates an average peak value of said light attenuation to generate said electrical signal proportional to the modulation of said light signal;
   filter circuit means for dividing said electrical signal into at least two output signals with said output signals being offset in time, said filter circuit means having means for comparing each output signal with a predetermined reference level for eliminating signal noise;
   and computer means in communication with said output signals for determining the measured variable therefrom and for correcting the measured variable according to process variables.

2. The system according to claim 1 wherein said computer means including digital means for communicating to and from the vortex shedding flowmeter.

3. The system according to claim 1 wherein said computer means is capable of calculating the non-linearity of the vortex shedding phenomena and correcting said measured variable according thereto.

4. The system according to claim 1 further comprising a temperature sensor in communication with said computer means for inputting a temperature process variable for correction of the measured variable.

5. The system according to claim 1, further comprising means for regulating a 4-20 mA current loop responsive to said computer means.

* * * * *